United States Patent
Bosscher et al.

(10) Patent No.: US 8,918,215 B2
(45) Date of Patent: Dec. 23, 2014

(54) TELEMATIC INTERFACE WITH CONTROL SIGNAL SCALING BASED ON FORCE SENSOR FEEDBACK

(75) Inventors: Paul M. Bosscher, West Melbourne, FL (US); Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 355 days.

(21) Appl. No.: 13/009,040

(22) Filed: Jan. 19, 2011

(65) Prior Publication Data

US 2012/0185099 A1 Jul. 19, 2012

(51) Int. Cl.
G05B 15/00 (2006.01)
G05B 19/00 (2006.01)
B25J 9/16 (2006.01)
G05B 19/427 (2006.01)

(52) U.S. Cl.
CPC ............. *B25J 9/1689* (2013.01); *G05B 19/427* (2013.01)
USPC .......................................... 700/264; 700/245

(58) Field of Classification Search
USPC ...................... 700/245–264; 340/853.1–856.4
See application file for complete search history.

(56) References Cited

U.S. PATENT DOCUMENTS

| | | | |
|---|---|---|---|
| 3,280,991 A | | 10/1966 | Melton |
| 3,637,092 A | | 1/1972 | George et al. |
| 4,216,467 A | | 8/1980 | Colston |
| 4,521,685 A | * | 6/1985 | Rebman ........................ 250/229 |
| 4,604,016 A | * | 8/1986 | Joyce ................................ 414/7 |
| 4,655,673 A | * | 4/1987 | Hawkes ........................ 414/730 |
| 4,661,032 A | * | 4/1987 | Arai ............................... 700/260 |
| 4,762,006 A | * | 8/1988 | Asakawa et al. ......... 73/862.044 |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

Zarrad, W., et al., "Stability and Transparency Analysis of a Haptic Feedback Controller for Medical Applications", Proceedings of the 46th IEEE Conference on Decision and Control :New Orleans, LA, Dec. 12-14, 2007, IEEE, Piscataway, NJ, USA, Dec. 1, 2007, pp. 5767-5772.

(Continued)

*Primary Examiner* — Bhavesh V Amin
(74) *Attorney, Agent, or Firm* — Fox Rothschild LLP; Robert J. Sacco, Esq.

(57) ABSTRACT

Method and system for telematic control of a slave device. A stiffness of a material physically contacted by a slave device (202) is estimated based on information obtained from one or more slave device sensors (216, 217). Based on this stiffness estimation, a motion control command directed to the slave device is dynamically scaled. A data processing system (204) is in communication with a control interface (203) and the slave device. The data processing system (204) is configured to generate the motion control commands in response to sensor data obtained from the control interface. The system (200) also includes a stiffness estimator (602) configured for automatically estimating a stiffness of a material physically contacted by the slave device based on information obtained from the slave device sensors. A scaling unit (607) is responsive to the stiffness estimator and is configured for dynamically scaling the motion control command.

22 Claims, 6 Drawing Sheets

(56) References Cited

U.S. PATENT DOCUMENTS

| | | | |
|---|---|---|---|
| 4,791,588 A * | 12/1988 | Onda et al. | 700/260 |
| 4,795,296 A * | 1/1989 | Jau | 414/5 |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A * | 8/1989 | Seraji | 700/260 |
| 4,862,751 A * | 9/1989 | Asakawa et al. | 73/862.044 |
| 4,893,981 A | 1/1990 | Yoshinada et al. | |
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,184,319 A * | 2/1993 | Kramer | 703/5 |
| 5,193,963 A * | 3/1993 | McAffee et al. | 414/5 |
| 5,231,693 A * | 7/1993 | Backes et al. | 700/264 |
| 5,382,885 A | 1/1995 | Salcudean et al. | |
| 5,413,454 A | 5/1995 | Movsesian | |
| 5,430,643 A | 7/1995 | Seraji | |
| 5,451,924 A * | 9/1995 | Massimino et al. | 340/407.1 |
| 5,508,596 A * | 4/1996 | Olsen | 318/569 |
| 5,565,891 A | 10/1996 | Armstrong | |
| 5,589,828 A | 12/1996 | Armstrong | |
| 5,619,180 A * | 4/1997 | Massimino et al. | 340/407.1 |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A * | 11/1998 | Jacobus et al. | 318/568.11 |
| 6,028,593 A * | 2/2000 | Rosenberg et al. | 345/156 |
| 6,047,610 A | 4/2000 | Stocco et al. | |
| 6,084,587 A * | 7/2000 | Tarr et al. | 345/419 |
| 6,088,017 A * | 7/2000 | Tremblay et al. | 345/156 |
| 6,104,158 A | 8/2000 | Jacobus et al. | |
| 6,184,868 B1 | 2/2001 | Shahoian et al. | |
| 6,191,796 B1 * | 2/2001 | Tarr | 345/581 |
| 6,246,390 B1 | 6/2001 | Rosenberg | |
| 6,271,833 B1 * | 8/2001 | Rosenberg et al. | 345/161 |
| 6,281,651 B1 | 8/2001 | Haanpaa et al. | |
| 6,522,952 B1 * | 2/2003 | Arai et al. | 700/258 |
| 6,535,793 B2 | 3/2003 | Allard | |
| 6,592,315 B2 | 7/2003 | Osborne, Jr. | |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 | 9/2004 | Sanchez et al. | |
| 6,801,008 B1 | 10/2004 | Jacobus et al. | |
| 6,857,878 B1 * | 2/2005 | Chosack et al. | 434/267 |
| 7,138,981 B2 | 11/2006 | Kim et al. | |
| 7,158,112 B2 * | 1/2007 | Rosenberg et al. | 345/156 |
| 7,168,748 B2 | 1/2007 | Townsend et al. | |
| 7,208,900 B2 | 4/2007 | Carlson et al. | |
| 7,225,404 B1 * | 5/2007 | Zilles et al. | 715/701 |
| 7,345,672 B2 | 3/2008 | Jacobus et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 | 4/2011 | Sjoberg et al. | |
| 8,226,072 B2 | 7/2012 | Murayama | |
| 8,373,391 B1 | 2/2013 | Allen et al. | |
| 8,447,440 B2 | 5/2013 | Phillips et al. | |
| 8,473,101 B2 | 6/2013 | Summer | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 * | 12/2004 | Riener et al. | 703/7 |
| 2005/0087373 A1 | 4/2005 | Wakitani et al. | |
| 2005/0252329 A1 | 11/2005 | Demers | |
| 2006/0048364 A1 * | 3/2006 | Zhang et al. | 29/407.08 |
| 2006/0066574 A1 | 3/2006 | Kim et al. | |
| 2006/0117258 A1 | 6/2006 | Yu | |
| 2006/0178775 A1 | 8/2006 | Zhang et al. | |
| 2007/0013336 A1 | 1/2007 | Nowlin et al. | |
| 2007/0050139 A1 | 3/2007 | Sidman | |
| 2007/0095582 A1 | 5/2007 | Stuijt et al. | |
| 2008/0009971 A1 * | 1/2008 | Kim et al. | 700/245 |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 | 3/2009 | Dariush et al. | |
| 2009/0182436 A1 * | 7/2009 | Ferrara | 623/57 |
| 2010/0019890 A1 | 1/2010 | Helmer et al. | |
| 2010/0041991 A1 * | 2/2010 | Roundhill | 600/443 |
| 2010/0070079 A1 | 3/2010 | Mangaser et al. | |
| 2010/0092267 A1 | 4/2010 | Najdovski et al. | |
| 2010/0100256 A1 | 4/2010 | Jurmain et al. | |
| 2010/0168918 A1 * | 7/2010 | Zhao et al. | 700/259 |
| 2010/0169815 A1 * | 7/2010 | Zhao et al. | 715/771 |
| 2010/0172733 A1 | 7/2010 | Chalubert et al. | |
| 2011/0015569 A1 | 1/2011 | Kirschenman et al. | |
| 2011/0046781 A1 | 2/2011 | Summer | |
| 2011/0155785 A1 | 6/2011 | Laurent et al. | |
| 2011/0257786 A1 | 10/2011 | Caron L'Ecuyer et al. | |
| 2012/0095619 A1 | 4/2012 | Pack et al. | |
| 2012/0150351 A1 | 6/2012 | Bosscher et al. | |
| 2012/0184955 A1 | 7/2012 | Pivotto et al. | |
| 2012/0185098 A1 * | 7/2012 | Bosscher et al. | 700/260 |
| 2012/0185099 A1 * | 7/2012 | Bosscher et al. | 700/264 |
| 2013/0328770 A1 | 12/2013 | Parham | |
| 2014/0031983 A1 | 1/2014 | Low et al. | |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 | 7/2003 |
| WO | 2006 016799 A1 | 2/2006 |
| WO | 2007051000 A2 | 5/2007 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and System '96, IROS 96, Proceedings of the 1996 L EEE/RSJ International Conference on Osaka, Japan, Nov. 4-8, 1996, New York, NY, USA, IEEE, US, vol. 2, 4, Nov. 1996, pp. 425-430, XP010212433.

Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Information about Related Patents and Patent Applications, see section 6 of the accompanying Information Disclosure Statement Letter, which concerns Related Patents and Patent Applications.

(56) References Cited

OTHER PUBLICATIONS

Marshall, W.C., et al., "A Testbed for Deisgn of User-Friendly, Multiple-Degree-of-Freedom, Manual Controllers", Scientific Honeyweller, Honeywell's Corporate. Minneapolis, US Jan. 1, 1993, pp. 78-86.
International Search Report dated Oct. 29, 2012; Application Serial No. PCT/US2012/034207 in the name of Harris Corporation.
International Search Report dated Jan. 15, 2013, Application Serial No. PCT/US2012/037751 in the name of Harris Corporation.
International Search Report mailed Jan. 4, 2013, International Application Serial No. PCT/US2012/058303 in the name of Harris Corporation.
Rogers, JE., et al., "Bi-directional Gap Closing MEMS Actuator Using Timing and Control Techniques", IEEE Industrial Electronics, IECON 2006—32nd Annual Conference on, IEEE, Piscataway, NJ USA Nov. 1, 2006, pp. 3469-3154.
Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.
European Search Report mailed Mar. 14, 2012, Application Serial No. 11009319.2-2316, in the name of Harris Corporation.
Alqasemi R et al: "Kinematics, control and redundancy resolution of a 9-DoF wheelchair-mounted robotic arm system for ADL tasks",Mechatronics and Its Applications, 2009. ISMA '09. 6th International Symposium on, IEEE, Piscataway, NJ, USA, Mar. 23, 2009, pp. 1-7.
Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.
Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.
International Search Report mailed May 2, 2013, International Application No. PCT/US2012/051314, in the name of Harris Corporation.
Torres Rocco, A.C., "Development and testing of a new C-based algorithm to control 9-degree-of-freedom wheelchair-mounted-robotic-arm system". Jun. 1, 2010. Univ. of So. Florida.
Alqasemi, R., et al., "Maximizing Manipulation Capabilities for People with Disabilities Using 9-DoF Wheelchair-Mounted Robotic Arm System", 2007, IEEE.
International Search Report mailed May 12, 2014, Applicaiton Serial No. PCT/US2013/069071, in the name of Harris Corporation.
Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.
Tijsma, H.A. et al., A Framework of Interface Improvements for Designing New User Interfaces for the MANUS Robot Arm, Proceedings of the 2005 IEEE, 2005, 235-240.
Rocco, Ana Catalina Torres, Development and testing of a new C-based algoithm to control a 9-degree-of-freedom wheelchair-mounted-robotic-arm system, University of South Florida, Jun. 1, 2010.

* cited by examiner

TELEMATIC INTERFACE WITH CONTROL SIGNAL SCALING BASED ON FORCE SENSOR FEEDBACK

STATEMENT OF THE TECHNICAL FIELD

The inventive arrangements relate to robot methods and systems, and more particularly to telematic controls for such systems.

DESCRIPTION OF THE RELATED ART

Simple user interface systems can provide a separately operable control for each movable joint of a robot, robotic manipulator, or other slave device. More complex systems can include hand controllers (sometimes in the form of a pistol grip), which sense the movement by a user's hand. The hand controller generates one or more control signals which are then used for actuating various motion operations of the robot. The control system of the robot will respond to these control signals by activating certain servo-motors, solenoids, or other devices within the robotic manipulator to produce the desired action. Video cameras can be used to provide visual information to a remote operator regarding a work piece and/or the environment surrounding the robotic manipulator.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and devices. For example, U.S. Pat. No. 5,831,408 to Jacobus et al. discloses that force feedback systems are sometimes used to communicate forces generated on a robotic hand back to a user, through a hand controller. If the robotic hand physically engages an object, the physical engagement is felt by the user's hand. In such systems, force sensors in the slave device detect forces exerted upon such device. The information relating to such forces is communicated to a control unit, where the information is used to generate suitable tactile feedback for a user.

When telematic controls and haptic technology are used to control a remotely located robotic slave device, there is an inevitable latency in the telematic system. Such latency will result in some delay between the time that a user initiates a control input and the time that the robot slave device responds to such input. Similarly, there will be some delay between the time that a force sensor detects a force exerted upon the slave unit, and the time when a tactile response is generated at a user interface.

SUMMARY OF THE INVENTION

The invention concerns a method and system for telematic control of a slave device. The method involves automatically estimating a stiffness of a material that the slave device has made physical contact with based on information obtained from one or more slave device sensors, and then dynamically scaling a motion control command directed to the slave device based on the estimated stiffness. The sensors can include force sensors and position sensors.

The scaling step can include modifying the motion control command to specify a second velocity at which the slave device is commanded to move, which is different as compared to a first velocity specified by the motion control command. The second velocity can be less than the first velocity. More particularly, the second velocity is selectively decreased to a greater extent when the slave device makes physical contact with a material having a greater estimated stiffness as compared to material having a lesser estimated stiffness.

In some telematic systems, motion commands can specify a distance to be moved rather than a velocity. In such cases, the scaling step can include modifying the motion control command to specify a second distance the slave device is commanded to move, which is different as compared to a first distance specified by the motion control command. The second distance can be less than the first distance. More particularly, the second distance can be selectively decreased to a greater extent when the slave device makes physical contact with a material having a greater estimated stiffness as compared to material having a lesser estimated stiffness.

The stiffness of the material with which the slave device has made physical contact can be estimated based on a force measurement performed by at least a first one of the slave device force sensors. The stiffness can also be estimated based on a position measurement performed by at least a second one of the slave device sensors. In some embodiments, the stiffness estimate is based on a sensed change in the force measurement and a sensed change in the position measurement. The force measurement and position measurement can be with respect to a linear axis (linear displacement) or with respect to a rotational axis (angular displacement). After the stiffness estimate has been obtained, the scaling step can be performed based on the stiffness which has been estimated and further based on a sensed magnitude of force exerted upon the slave device. In addition to its use in connection with scaling operations, the information obtained from the slave device sensors can be used to provide haptic feedback at the user interface control. The haptic feedback can be provided with respect to one or more linear axes and/or one or more rotational axes defined with respect to the user interface.

The invention also concerns a robot system. The robot system includes a control interface having one or more control sensors for sensing a physical displacement of a user interface control in a control direction (linear or rotational), and a slave device configured for moving or changing its pose in response to at least one motion control command. A data processing system is in communication with the control interface and the slave device, and configured to generate the motion control command in response to sensor data obtained from the control sensors. The robot system also includes a stiffness estimator configured for automatically estimating a stiffness of a material with which the slave device has made physical contact based on information obtained from one or more slave device sensors. A scaling unit can also be provided. The scaling unit is responsive to the stiffness estimator and is configured for dynamically scaling the at least one motion control command based on the estimated stiffness.

According to some embodiments, the scaling unit is configured to modify the motion control command to specify a second velocity which is different compared to a first velocity indicated by the motion control command. The motion control command can be a command for causing linear or rotational displacement of the slave device. In some embodiments, the scaling unit is configured to modify the second velocity to be less than the first velocity. More particularly, the scaling unit is configured to modify the motion control command so that the second velocity is selectively decreased to a greater extent when the slave device makes physical contact with a material having a greater estimated stiffness as compared to material having a lesser estimated stiffness.

In an alternative embodiment, the scaling unit is configured to modify the motion control command to specify a second distance which is different compared to a first distance as indicated by the motion control command. This distance can be a linear distance or a angular distance measured about an axis of rotation. In such embodiments, the scaling unit can be configured to modify the second distance to be less than the first distance. More particularly, the scaling unit can be configured to selectively modify the motion control command so that the second distance is decreased to a greater extent when the slave device makes physical contact with a material having a greater estimated stiffness as compared to material having a lesser estimated stiffness.

The stiffness estimator is configured to estimate the stiffness based on a force measurement performed by at least a first one of the slave device force sensors. The force sensors can be arranged to measure linear forces or angular/rotational forces applied to the slave device. The stiffness estimator can be configured to also estimate the stiffness based on a position measurement performed by at least a second one of the slave device sensors. The position measurement can be measured with regard to linear and/or angular displacement. For example, the stiffness estimator can be configured to estimate the stiffness based on a change in the force measurement and a change in the position measurement.

In addition to using the slave device sensor data for scaling operations, the data processing system can be configured so that it is responsive to such information for generating a haptic feedback control signal. The user interface control can include at least one motivating device responsive to such haptic feedback control signal for generating haptic feedback to a user.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention concerns an improved telematic system for remote control of a slave device, such as a robot manipulator arm. When telematic controls and haptic technology are used to control a remotely located robotic slave device, there is an inevitable latency in the telematic system. Such latency can result in the control system exhibiting certain undesirable behaviors. For example, when a robot manipulator arm which includes haptic technology makes physical contact with a surface or material, the force sensors associated with the manipulator will detect a force applied to the manipulator arm. Information regarding the force and/or position of the manipulator arm will be communicated to the control system. The control system will respond by generating a signal which activates a haptic actuator device (e.g. a motor or other device for generating a force) in a user interface to cause some tactile feedback to be experienced by a user. For example, a motor can exert a force upon an interface control which is opposed to an input force exerted by the operator of such device.

When the surface that the manipulator arm has made physical contact with is rigid or has high stiffness, the force measured by the force sensor can arise suddenly and can be relatively large. This sensed force is communicated to the control system and results in a rather sudden and substantial force being applied to the user by the haptic motivating device in the user interface. The force will often be sufficient to move the user's hand or other appendage which is grasping the user interface control for the manipulator, and such movement will be detected by the user interface. However, rather than recognizing that the movement was caused by the haptic system feedback, the control system will interpret the movement of the user interface control as an indication that the user wants to move the manipulator away from the rigid surface which has been physically contacted. Accordingly, the control system will signal the robot arm to move away from the contacted surface.

This movement away from the contacted surface will reduce the force measured by the force sensors in the robotic manipulator. The change in force sensor output will result in the control system reducing the force being applied to the user by the haptic motivating device in the user interface. The reduced force will allow the user's hand, or other appendage which is grasping the user interface control for the manipulator, to at least partially return to its previous position, thereby causing the manipulator to once again make physical contact with the material or surface. This contact, will begin the cycle again by causing a large force to be measured by force sensors on the manipulator.

Due to the latency in the telematic system, the net result of this process will be a repetitive or cyclical oscillation in which the robot arm repeatedly contacts and then moves away from the rigid surface, causing a jackhammer effect. This effect will also be experienced at the user interface as a repetitive mechanical oscillation of the interface control. This mechanical oscillation is not desirable, can damage the robot and is a nuisance to an operator.

Figure 1A:
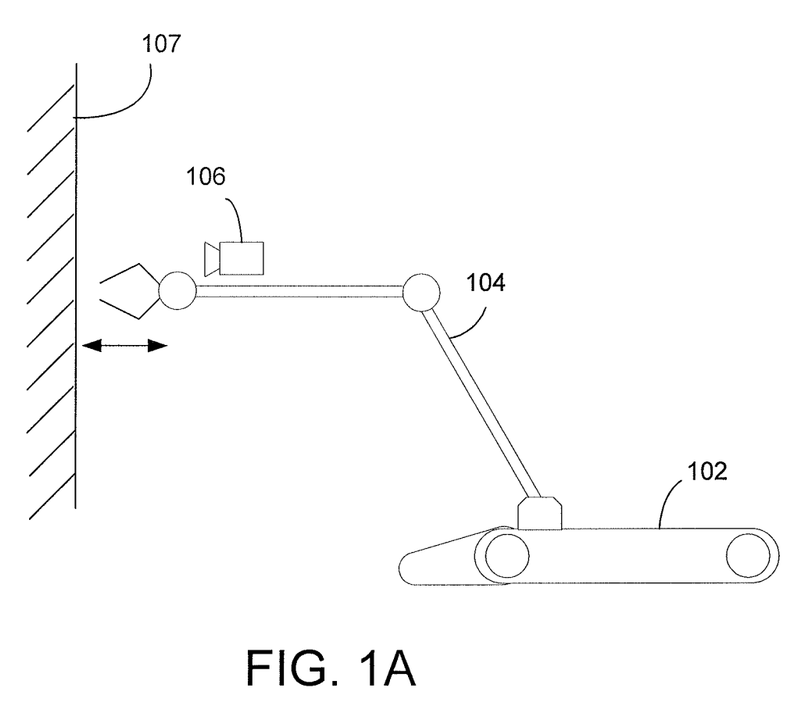
FIG. 1 is a drawing showing a robot slave device and associated control system that is useful for understanding the invention.
Figure 1B:
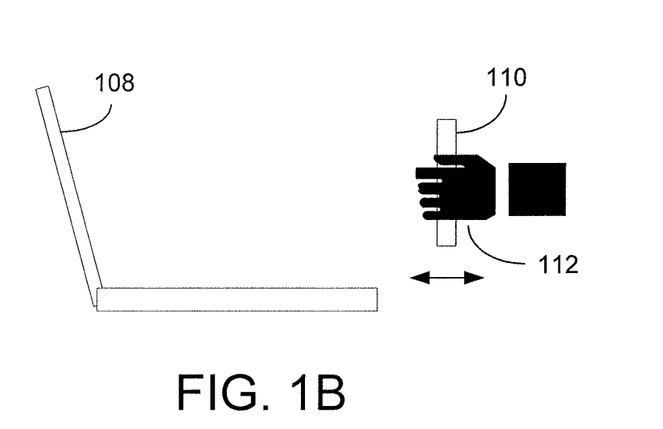

The control problem described above can be more readily understood by referring to FIGS. 1A and 1B. In FIG. 1A there is illustrated a slave device, which in this case is an unmanned ground vehicle (UGV) 102. The UGV 102 has a manipulator 104, which in this example is a robot arm. In FIG. 1B there is shown a control system processor 108 which can include a video display unit for displaying a video image obtained from a camera 106. A hand control 110 senses input control motions of a user 112 and communicates user input signals to the control system processor 108. In response, the control system processor communicates control signals to the UGV for controlling the movement of the robot arm. A data link (not shown) can be used for the purpose of communicating control signals to a remotely located UGV. The user interface, control system processor, and data link can together comprise a telematic control system with haptic feedback. When the manipulator 104 encounters a rigid surface 107, the latency associated with the telematic control system will cause the jackhammer effect described above. In conventional systems, the manipulator will mechanically oscillate as indicated by the arrow in FIG. 1A, and the hand control 110 will mechanically oscillate as shown by the arrow in FIG. 1B.

In an embodiment of the invention, information obtained from one or more slave device sensors is used to determine or estimate a stiffness of a material physically contacted by the slave device. Thereafter, the control signal is scaled based on the estimated stiffness. The scaling involves modifying one or more control signals to provide a reduced velocity of the slave device motion relative to the velocity that would normally result from a user input control gesture. Alternatively, the control signals can be modified to reduce a distance that a slave device moves relative to a distance that would normally result from a user input control gesture in the absence of the slave device physically contacting the relatively stiff material.

In some embodiments, the scaling involves modifying a signal which controls a velocity of the slave device based on the estimated stiffness. In other embodiments, the scaling involves modifying a signal which controls a distance a slave device based on the estimated stiffness.

In some embodiments of the invention the stiffness estimation is also based on a force measurement performed by the slave device force sensor. The stiffness estimation is advantageously further based on information concerning a position or movement of the slave device as the force is being measured. For example, in some embodiments, the stiffness estimate can be based on information concerning a rate of change of the force measured by the slave device compared to a rate of change of position. Thereafter, the scaling described herein can be based on a scaling factor. The scaling factor can be determined based on a stiffness estimate alone. However, it can be advantageous to determine a scaling factor based on a combination of estimated stiffness in combination with a force exerted upon a slave device. In a general sense, the scaling factor will decrease as stiffness increases, such that velocity and/or distance are generally decreased as estimated stiffness increases. However, this is not necessarily true for all changes in stiffness. Instead, the scaling factor can remain the same for certain small changes in stiffness. The choice of scaling factor will be discussed in greater detail as the discussion progresses.

The information obtained from the slave device sensors can also be used to provide haptic feedback at the user interface control. Such haptic feedback can include linear and rotational forces applied to the user interface control.

Figure 2:
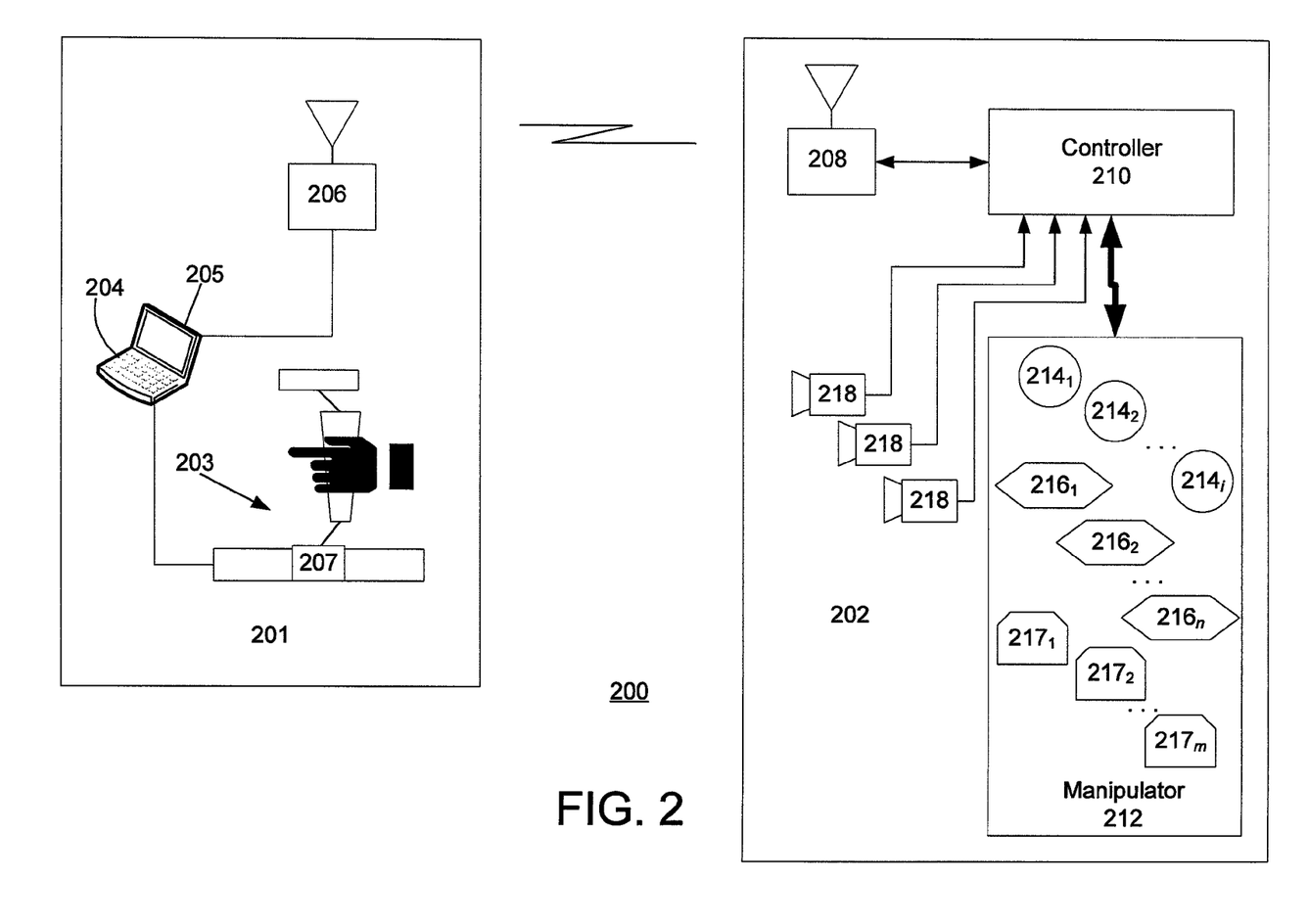
FIG. 2 is a block diagram that is useful for understanding a slave device and associated control system.

Referring now to FIG. 2, there is provided a simplified block diagram showing a robotic system 200 that includes a control system 201 and a slave device 202. A data communication link is provided between the control system 201 and slave device 202. The data communication system allows the control system 201 to communicate commands to slave device 202, and allows the control system to receive feedback information from the slave device 202.

The control system 201 includes an operator control interface 203, a data processing system 204, and a data link 206. In some embodiments, the operator control interface 203 can be a hand control which can be grasped by a user. In some embodiments, the hand control can detect hand movement along one, two or three orthogonal axes of motion. In some embodiments, the hand control can also sense hand movement with respect to one, two or three rotational axes. Hand controls of this type are known in the art and therefore will not be described here in detail. The operator control interface has one or more sensors 207 for detecting movement of the control as effected by the user. Still, it should be understood that the invention is not limited to any particular type of operator control interface 203. Instead, any user interface device that is known in the art now or in the future can be used, provided that such user interface device is capable of generating output signals in response to user input commands for purposes of remotely controlling a pose of a slave device.

Data processing system 204 and data link 206 will be described in further detail in relation to FIG. 6. However, it should be noted that in some embodiments, data processing system 204 can include a portable computer programmed with a set of instructions. The data processing system 204 can have an integrated display unit 205 as shown for purposes of displaying video images. However, the invention is not limited in this regard, and a separate video display unit (not shown) can also be used with the data processing system. Data link 206 can be any type of wired or wireless transceiver suitable for communicating data to and from data link 208 provided in slave device 202. Such data can include motion control commands directed to slave device 202, feedback data communicated from slave device 202 to the data processing system 204, and video data communicated from the slave device 202 to the data processing system 204.

Slave device 202 can be any type of remotely controlled slave device or robot system capable of performing moving, manipulating and/or grasping actions based on telematic commands received from control system 201. Slave device 202 can include onboard circuitry for processing motion control commands and communicating feedback data to control system 201. For example, slave device 202 can advantageously include an on-board controller 210. The on-board controller 210 can be any suitable type of processing device such as a microprocessor, microcontroller, application specific integrated circuit, and so on. The on-board controller 210 can further include software, firmware or other programming for carrying out the methods described herein. The on-board controller 210 performs communication operations involving data link 208, which can provide communication capabilities similar to those described herein with regard to data link 206.

Figure 5:
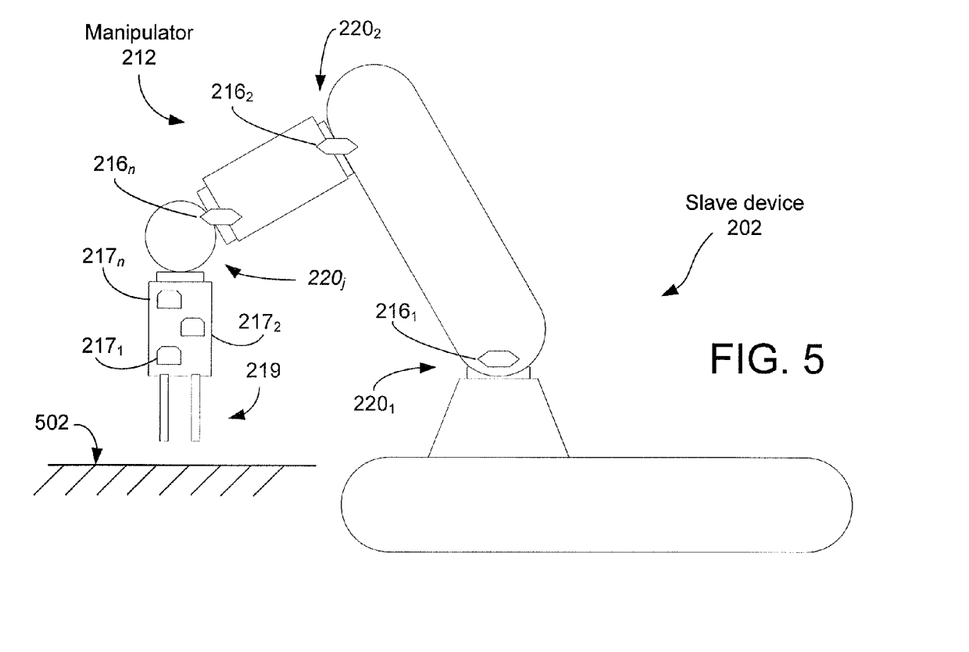
FIG. 5 is a diagram that is useful for understanding robot slave unit of the present invention.

In some embodiments of the invention, the slave device 202 is comprised of a remotely controlled manipulator 212. The manipulator 212 can include any movable mechanical appendage associated with the slave device. According to some embodiments, the manipulator can be a remotely controlled robot arm which includes one or more mechanical joints. For example, such an embodiment of slave device 202 is shown in FIG. 5. Robot arms of this type are well known in the art and therefore will not be described here in detail. However, a brief description of one embodiment of a manipulator 212 is provided to help understand the invention.

Referring now to FIG. 2 and FIG. 5, the manipulator 212 can include a grasping device 219. The manipulator 212 can include one or more servos $214_1, 214_2, \ldots 214_j$ or other suitable motivating devices for moving one or more mechanical joints $220_1, 220_2, \ldots 220_j$ of the manipulator in a direction and at a velocity determined by the control signals. Such control signals can be communicated to the slave device 202 from control system 201.

The feedback information communicated from slave device 202 to control system 201 can include position information with regard to the one or more movable joints of the manipulator 212. The position information can be provided by one or more sensors $216_1, 216_2, \ldots 216_n$. For example, in FIG. 5, sensors $216_1, 216_2, \ldots 216_n$ are provided at each of movable joints $220_1, 220_2, \ldots 220_j$. In some embodiments, cameras 218 can be mounted to movable portions of the manipulator 212. One or more sensors can be provided for detecting forces exerted upon the manipulator 212. For example, one or more force sensors $217_1, 217_2, \ldots 217_m$ can detect forces (i.e. linear and/or rotational forces) exerted upon the manipulator 212 and associated grasping device 219. In FIG. 5, three force sensors are shown at the base of grasping device 219, but the invention is not limited in this regard. More or fewer force sensors can be advantageously arranged to measure linear and/or rotational forces exerted upon the manipulator 212 when the manipulator physically contacts or touches materials or surfaces in the environment. In some embodiments of the invention, the sensors $216_1, 216_2, \ldots 216_n$ and $217_1, 217_2, \ldots 217_m$ can be arranged so that the position and forces exerted upon the manipulator are measured with respect to as many as three orthogonal linear axes (x, y, z) and as many as three axes of rotation.

The data from the sensors $216_1, 216_2, \ldots 216_n$ and $217_1, 217_2, \ldots 217_m$ is communicated to the on-board controller 210, which performs any necessary data formatting before communicating the data to data link 208. The information is then communicated by data link 208 to the control system 201. One or more cameras 218 can be attached to a portion of a manipulator and video information from the cameras can similarly be communicated to the control system 201.

Figure 3:
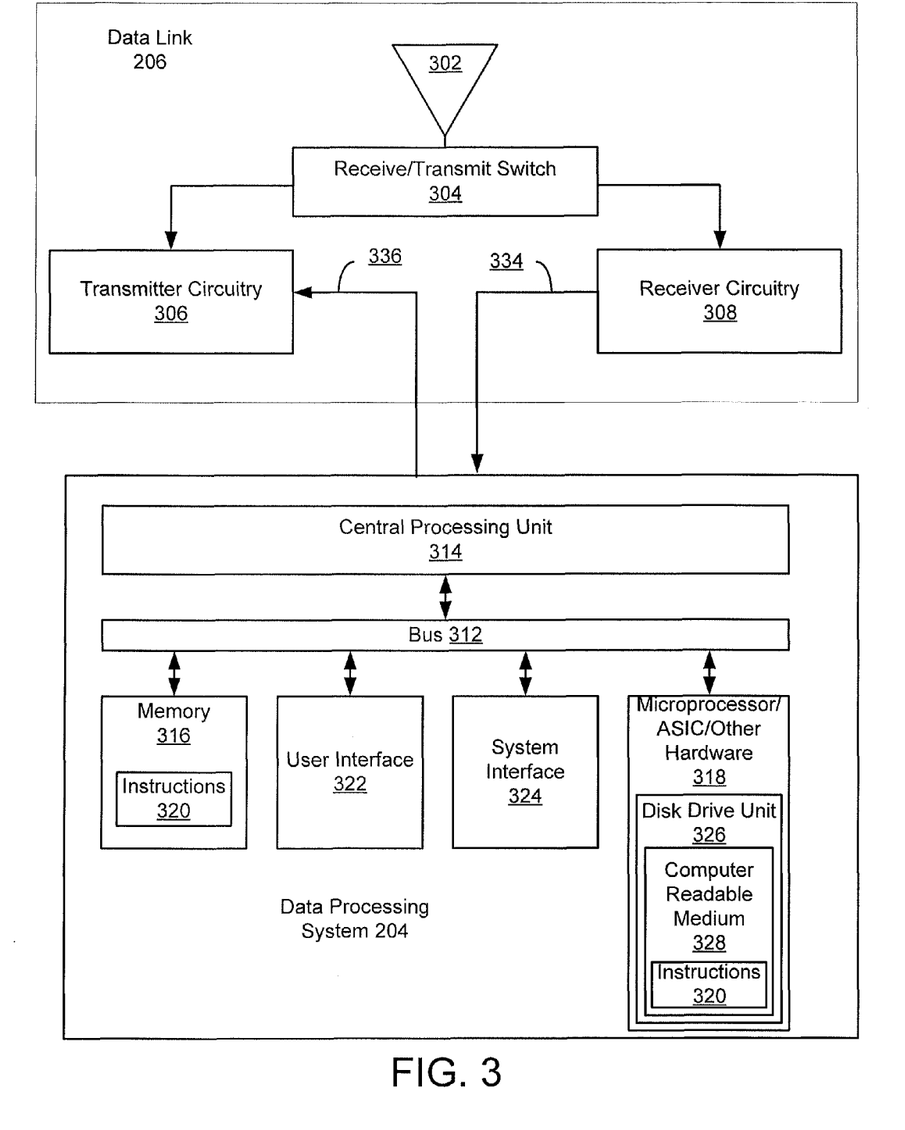
FIG. 3 is a detailed block diagram showing a data processing system and a data link that are useful for understanding the invention.

Referring now to FIG. 3, there is provided a detailed block diagram of the data link 206 of FIG. 2. Notably, the data link 206 may include more or less components than those shown in FIG. 3. However, the components shown are sufficient to disclose an illustrative embodiment implementing the present invention. The hardware architecture of FIG. 3 represents one embodiment of a representative data link configured to permit bi-directional data communication. However, it should be understood that the invention is not intended to be limited in this regard, and any other suitable data link architecture can be used for implementing wired or wireless communications.

As shown in FIG. 3, the data link 206 comprises an antenna 302 for receiving and transmitting Radio Frequency (RF) signals. A receive/transmit (Rx/Tx) switch 304 selectively couples the antenna 302 to the transmitter circuitry 306 and receiver circuitry 308 in a manner familiar to those skilled in the art. The receiver circuitry 308 decodes the RF signals received from a communication device (e.g., the communication device 208 of FIG. 2) to derive information therefrom. The receiver circuitry 308 is coupled to data processing system 204 via an electrical or optical connection 334. The receiver circuitry 308 provides decoded RF signal information to the data processing system 204. The data processing system 204 uses the decoded RF signal information in accordance with the function(s) of the invention as described herein.

The data processing system 204 also provides information to the transmitter circuitry 306 for encoding information and/or modulating information into RF signals. Accordingly, the data processing system 204 is coupled to the transmitter circuitry 306 via an optical or electrical connection 336. The transmitter circuitry 306 communicates the RF signals to the antenna 302 for transmission to communication device 208 of FIG. 2).

If data links 206, 208 are wireless devices as shown, the wireless interface can be based on any of a variety of well known wireless interface standards. Examples of such well known wireless interface standards can include the Bluetooth wireless standard, and the IEEE 802.11 family of standards. However, the invention is not limited in this regard and any other wireless interface standard can be used.

As shown in FIG. 3, the data processing system 204 comprises a system interface 324, a user interface 322, a Central Processing Unit (CPU) 314, a system bus 312, a memory 316 connected to and accessible by other portions of the data processing system 204 through system bus 312, and hardware entities 318 connected to system bus 312. System interface 324 allows the data processing system 204 to communicate directly with data link 206, network equipment and other data links via a wired communications link. At least some of the hardware entities 318 perform actions involving access to and use of memory 316, which may be a random access memory (RAM), a disk drive, and/or a compact disc read only memory (CD-ROM).

Hardware entities 318 may include microprocessors, application specific integrated circuits (ASICs) and other hardware. Hardware entities 318 may include a microprocessor programmed for facilitating the provision of data communication services and slave device control processing as described herein. In this regard, it should be understood that the microprocessor can access and run slave device control processing including stiffness estimation and scaling operations as described herein. The communication operations can include, but are not limited to, signal receiving operations, signal processing operations, signal generation operations, and signal communication operations.

As shown in FIG. 3, the hardware entities 318 can include a disk drive unit 326 comprising a computer-readable storage medium 328 on which is stored one or more sets of instructions 320 (e.g., software code) configured to implement one or more of the methodologies, procedures, or functions described herein. The instructions 320 can also reside, completely or at least partially, within the memory 316 and/or within the CPU 314 during execution thereof by the data link 206. The memory 316 and the CPU 314 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution that cause the data processing system 204 to perform any one or more of the methodologies of the present disclosure.

As evident from the above discussion, the data processing system 204 implements one or more method embodiments of the present invention. Exemplary method embodiments of the present invention will now be described in relation to FIG. 4. The methods used to perform control system processing and motion scaling operations can vary depending on the particular system implementation. Still, a brief discussion is provided to explain one possible way that such processing could be performed. Those skilled in the art will appreciate that the invention is not limited in this regard.

Figure 4:
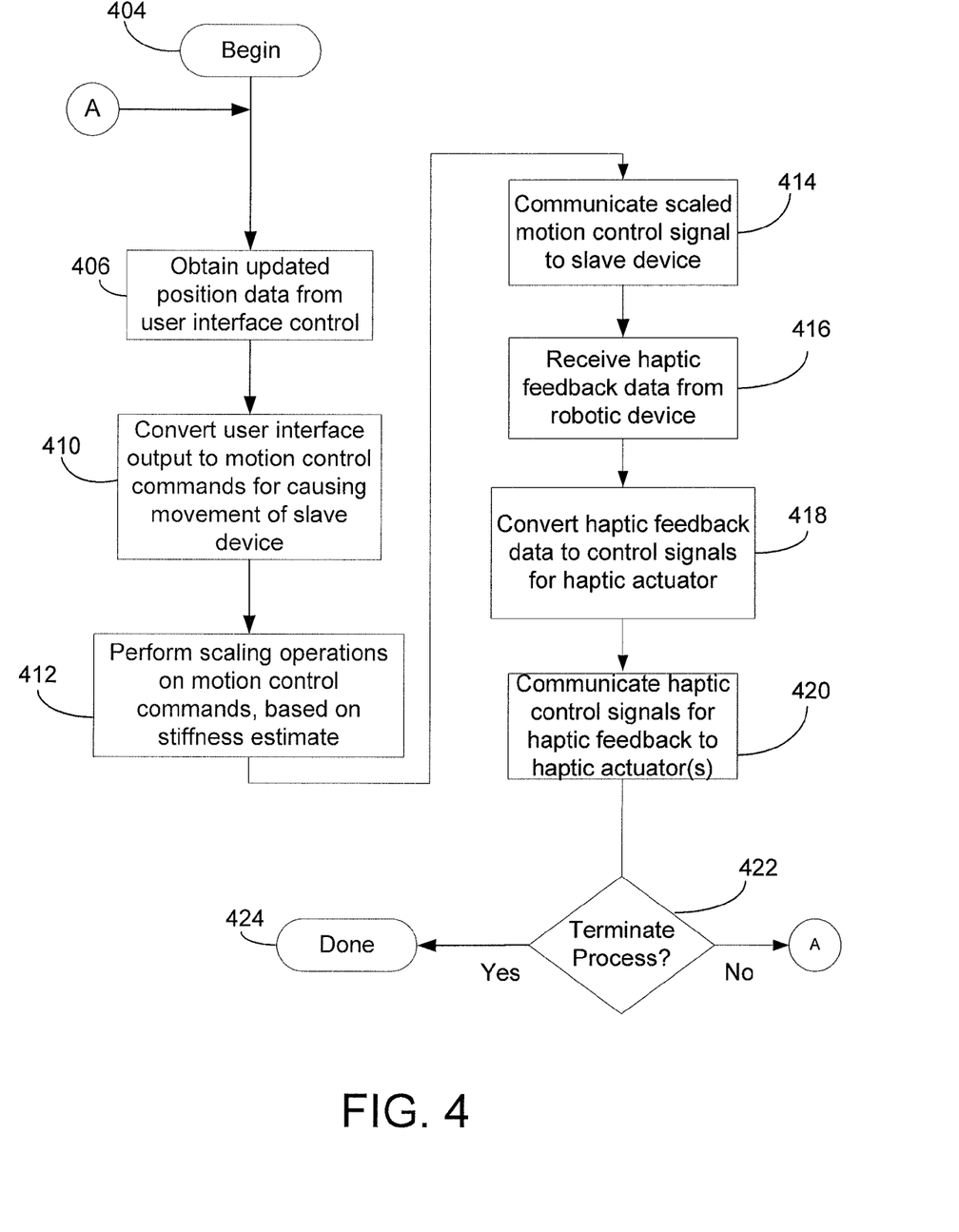
FIG. 4 is flow chart that is useful for understanding the invention.

The processing method in FIG. 4 can begin in step 404 and continues with step 406. Updated user interface control position data is obtained at 406. Such data can represent a position of a user interface control 203 which results from a user input.

For example, such data can represent a position of a six-axis hand control that is capable of sensing movement with six degrees of freedom. For example, the six degrees of freedom can include three linear degrees of freedom defined with respect to three orthogonal linear axes (x, y, z) and three rotational degrees of freedom (e.g. roll, pitch, yaw) defined with respect to three orthogonal rotational axes. In some embodiments, the rotational axes can be aligned with the linear axes; however the invention is not limited in this regard. By varying a position of the hand control, a user can completely control a pose of a slave device 202, including its position and orientation.

The process continues with step 410 where motion control commands are generated. This step can involve converting signals received from operator control interface 203 to a format that is suitable for causing a movement of the slave device 202 in a direction selected by a user. This step can be omitted if the output signals from the operator control interface 203 are already in a suitable form. However, in some embodiments this step can include determining a distance (linear or angular) that a position of an interface control has moved in a predetermined time, a direction of such movement, and/or a velocity of such movement. In this way, motion control commands can be determined based on input signals received from the operator control interface 203.

At 412, scaling operations are performed on the motion control commands. The processing related to step 412 is described in more detail with respect to FIGS. 5 and 6. Briefly, however, this step involves estimating a stiffness of a material that is touching or physically contacting the slave device, and using the stiffness estimation to scale at least one motion control command that is used to control the movement of the slave device. For example, if a manipulator 212 physically contacts a rigid surface, then a stiffness estimation of the rigid surface is performed based on feedback provided by one or more force sensors in the manipulator. The stiffness estimation can be used to generate a scaling factor, which is used to modify at least one motion control command intended for controlling the movement of the manipulator. In the absence of any detected physical contact with a rigid surface, the motion control commands can be used without modification.

In an embodiment in which operation 412 are performed at data processing system 204, one or more scaled motion commands are communicated to the slave device at 414 using data links 206, 208. Controller 210 responds to such commands by controlling one or more actuators or motivating devices (electric motors, servos, and so on) at the slave device to produce a movement of the slave device which is responsive to the user input commands at operator control interface 203. For example, in some embodiments the motion control commands can control a pose of a manipulator 212.

In step 416, haptic feedback data is optionally obtained from the robotic slave device 202. The haptic feedback data can include any information which is used to cause a force, vibration or other tactile feedback signal to be reproduced at operator control interface 203. The haptic feedback data can include data derived from force sensors at the robot slave unit 202, its associated manipulator arm 212, or its grasping device 219. Moreover, the haptic feedback can include the application of linear and/or rotational forces at the operator control interface. In some embodiments, the haptic feedback can include forces applied with respect to as many as six degrees of freedom. Still, the invention is not limited in this regard.

In step 418 the process continues by converting haptic feedback data to a format suitable for controlling a haptic actuator at operator control interface 203. Additional processing may be performed at this step to determine an appropriate tactile response to be generated at the operator control interface. At 420, control signals for haptic feedback are communicated to one or more haptic actuator devices associated with the operator control interface 203. The haptic control signals cause one or more actuators to produce a force or motion at the operator control interface. The force or motion that is produced at the operator control interface can be a linear force, a rotational force or both.

A determination is made at 422 as to whether the process should be terminated, for example in response to a user input. If so, [422: YES] then the process terminates at 424. If the process is not to be terminated [422: NO], then the process returns to step 406.

The stiffness estimation and scaling operations referenced in step 412 will now be described in further detail with regard to FIGS. 5 and 6. FIG. 6 is a conceptual drawing that is useful for understanding the processing associated with stiffness estimation and scaling operations. Those skilled in the art will appreciate that the stiffness estimation, calculation of a scaling factor, and related scaling operations can in some embodiments be performed at data processing system 204. In such implementations, force and position data from slave device 202 is communicated to data processing system 204, where the data is used to perform stiffness estimation, calculation of a scaling factor, and actual scaling of control signals.

In other embodiments of the present invention, one or more of the operations relating to stiffness estimation, calculation of scaling factors, and/or control signal scaling can be performed instead at slave device 202. For example, one or more of such processing steps can be performed at controller 210 provided at slave device 202. Still, the invention is not limited in this regard. Processing can also be performed at slave device 202 by means of any other suitable circuitry or processing system. Of course, the operations relating to stiffness estimation, calculation of scaling factor, and control signal scaling can be performed using any suitable combination of hardware, software and/or firmware.

Figure 6:
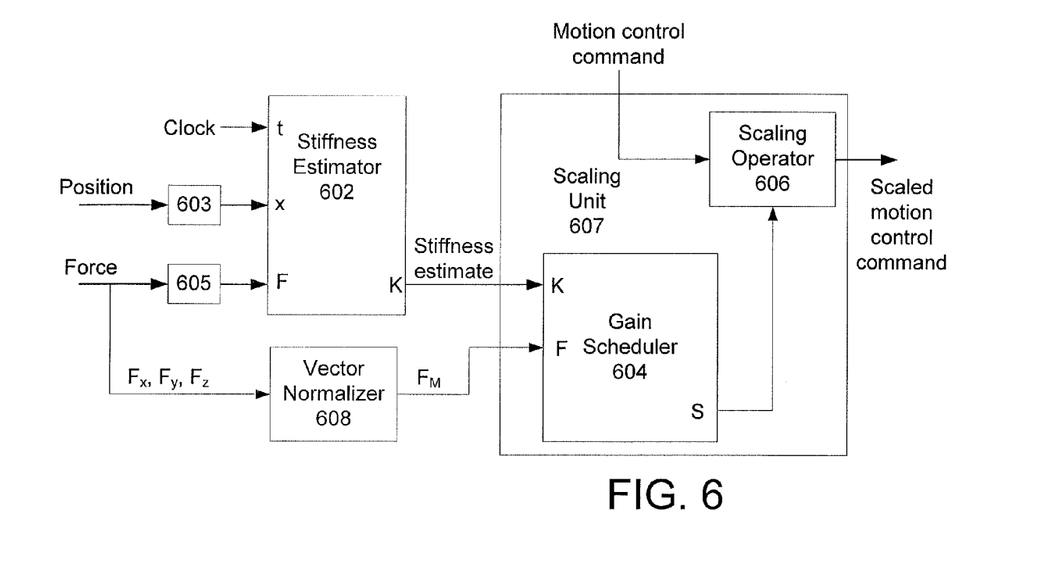
FIG. 6 is a conceptual drawing that is useful for understanding stiffness estimator and scaling operations of the present invention.

Turning now to FIG. 6, position and force data obtained from sensors $216_1, 216_2, \ldots 216_n$ and $217_1, 217_2, \ldots 217_m$ can be conditioned in filters 603, 605 before being communicated to stiffness estimator 602. The filters can be used to smooth the output of the sensors $216_1, 216_2, \ldots 216_n$ and $217_1, 217_2, \ldots 217_m$ to reduce noise and other unwanted sensor data artifacts. According to some embodiments, filters 603, 605 can be low pass filters.

Stiffness estimator 602 uses the position and force data from sensors $216_1, 216_2, \ldots 216_n$ and $217_1, 217_2, \ldots 217_m$ to estimate a stiffness of a material physically contacted by a slave device 202. For example, the stiffness estimator 602 can be used to calculate the stiffness of a material 502 which is physically contacted by a grasping device 219 of manipulator 212. The stiffness estimator 602 can determine an estimated stiffness based on input from force sensors $217_1, 217_2, \ldots 217_m$, position sensors $217_1, 217_2, \ldots 217_m$, or a combination of these inputs. According to a preferred embodiment, stiffness is estimated based on a measured change in force and a measured change in position such that an estimated stiffness $K=\Delta F/\Delta P$, where $\Delta F$ represents a change in force experienced by the manipulator 212 over some $\text{brief}_{period}$ of time, and $\Delta P$ represents a change in position of the manipulator 212 over some brief period of time. The period of time is not critical but should be generally less than about one second.

In some embodiments of the present invention, a multi-axis analysis can be performed for purposes of estimating stiffness. For example, stiffness can be estimated in the x, y, and z directions as follows:

$$K_x = \Delta F_x / \Delta P_x, K_y = \Delta F_y / \Delta P_y, K_z = \Delta F_z / \Delta P_z$$

Where $\Delta F_x$, $\Delta F_y$ and $\Delta F_z$ respectively represent the force exerted on manipulator 212 in the x, y and z directions; and $\Delta P_x$, $\Delta P_y$ and $\Delta P_z$ represent the change in manipulator position in the x, y, and z directions, respectively. The value of $K_x$, $K_y$, and $K_z$ can be separately evaluated and the largest such value can be selected as the estimated stiffness value K. Of course, the invention is not limited in this regard and other approaches can also be used to estimate stiffness. For example, a more complex approach could involve calculating a magnitude of K based on the combination of $K_x$, $K_y$, and $K_z$. Also, the value of $K_x$, $K_y$, and $K_z$ can in some embodiments be calculated as a moving average to help reduce the effects of noise and jitter.

In a more complex embodiments of the invention, the multi-axis stiffness analysis can also include evaluating stiffness with regard to one or more rotational axes. For example, in some embodiments, stiffness can be estimated based on torque measurements performed by one or more force sensors $217_1$, $217_2$, ... $217_m$ which can be configured for measuring rotational forces or torques experienced by the manipulator 212. If the rotational axes are aligned with the linear x, y, and z axes, then the rotational stiffness can be estimated with regard to the x, y, and z rotational axes as follows:

$$K_{x(r)} = \Delta F_{x(r)} / \Delta P_{x(r)}, K_{y(r)} = \Delta_{y(r)} / \Delta P_{y(r)}, K_{z(r)} = \Delta F_{z(r)} / \Delta P_{z(r)}$$

Where $\Delta F_{x(r)}$, $\Delta F_{y(r)}$ and $\Delta F_{z(r)}$ respectively represent the rotational force or torque exerted on manipulator 212 around the x, y and z rotational axes; and $\Delta P_{x(r)}$, $\Delta P_{y(r)}$ and $\Delta P_{z(r)}$ represent the angular change in manipulator position about the x, y, and z rotational axes, respectively. The value of $K_{x(r)}$, $K_{y(r)}$, and $K_{z(r)}$ can be separately evaluated and the largest such value can be selected as the estimated stiffness value $K_{(r)}$. The value of $K_{(r)}$ can also be compared to the value of $K_x$, $K_y$, and $K_z$ and the largest such value can then be selected as the estimated stiffness value K. Of course, the invention is not limited in this regard and other approaches can also be used to estimate stiffness. For example, a more complex approach could involve calculating a magnitude of K based on the combination of $K_x$, $K_y$, $K_z$ and $K_{x(r)}$, $K_{y(r)}$, and $K_{z(r)}$. Also, the values of $K_x$, $K_y$, $K_z$ and $K_{x(r)}$, $K_{y(r)}$, and $K_{z(r)}$ can in some embodiments be calculated as a moving average to help reduce the effects of noise and jitter. Regardless of how calculated, a value for the estimated stiffness K is communicated to a scaling unit 607, which can include gain scheduler 604 and scaling operator 606.

Gain scheduler 604 receives as inputs the estimated stiffness K and a value $F_M$, which represents a combined magnitude of $F_x$, $F_y$, $F_z$ (representing the linear forces measured by manipulator 212), and the rotational forces $F_{x(r)}$, $F_{y(r)}$, $F_{z(r)}$ representing the rotational forces measured by manipulator 212) In some embodiments, a scaling factor S can be determined based exclusively on the value of K. However, it has been found that physical contact force defined by $F_M$ can be useful for predicting the amount of scaling that is needed in certain instances for reducing the jackhammer effect described herein. Accordingly, it is preferable to use both K and $F_M$ for purposes of determining a suitable value of S.

In general, larger values of estimated stiffness and force should result in the scaling factor being selected so as to lower the velocity of slave device motion and/or cause smaller changes in position of the slave device than would otherwise normally result from a particular control input (as compared to when a stiff surface is not encountered). However, the exact relationship between estimated stiffness, estimated force, and scaling will vary depending on the particular implementation.

In some embodiments, small variations in stiffness or force may produce no variation in the scaling factor.

For example, in some embodiments of the invention, every measured variation in stiffness and/or force can result in a different scaling value S. In such embodiments, a functional calculation can be performed each time the stiffness or force estimation is updated. Depending on the particular calculation that is selected for this purpose, any measurable increase in estimated stiffness or force, no matter how small, would result in a different scaling value. Still, this arrangement may not be desirable in all circumstances and therefore it can be desirable in some embodiments to have several different ranges of estimated stiffness and/or force (e.g. low, medium and high ranges). In such embodiments, the scaling factor can be determined based on the combination of ranges that the estimated stiffness and force coincide with. For example, if estimated stiffness is in the "high" range, and estimated force is in the "low" range then a scaling factor "$S_1$" can be selected. In contrast, if estimated stiffness is in the "high" range and estimated force is in the "medium" range, then a scaling factor $S_2$ can be chosen Variations in estimated stiffness and force within certain ranges might result in no variation of the scaling factor. In this regard, it should be appreciated that not every variation in estimated stiffness and/or force will necessarily produce a corresponding change in a motion control signal.

The precise manner by which the scaling factor is determined is not critical to the present invention. Accordingly, gain scheduler 604 can use any suitable technique to determine an appropriate value for the scaling factor S, based on the values of K and $F_M$. For example, in some embodiments a mathematical function can be used for calculating a new value of S for all values of K and $F_M$. The particular equation selected would depend on the particular implementation. In other embodiments, a look-up table could be used for this purpose instead of an equation. The look up table could define a scaling factor for each combination of estimated stiffness range and force range. Preferably, in such an arrangement, table values for S would be defined for each value of K and $F_M$ within each of a plurality of predefined ranges.

Figure 7:
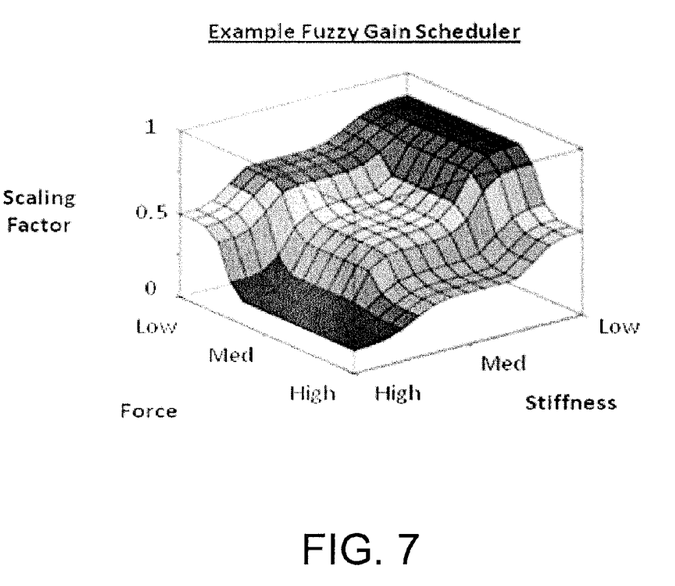
FIG. 7 is a plot that is useful for understanding a gain scheduler of the present invention.

In other embodiments, a fuzzy logic approach can be used to determine a value for the scaling factor. As will be appreciated by those skilled in the art, fuzzy logic implementations can be developed based on empirical evaluation as opposed to model a system mathematically. As such, the values of the scaling factor can be determined based on empirical experience of an operator rather than a mathematical system model. FIG. 7 is a three-dimensional plot which shows one example of a fuzzy logic gain scheduler that can be used with the present invention. Note that the scaling factor remains substantially constant within certain ranges of values for estimated stiffness and force. Of course, the actual values of S that are selected based on various values of K and $F_M$ will depend on the particular system implementation. However, in some embodiments, the value of S can be selected so that it has a range which extends between 0 and 1 as shown in FIG. 7.

As will be understood from the foregoing, the scaling factor value will generally decrease as the stiffness and force levels increase, but can remain substantially constant within certain ranges of values for estimated stiffness and force. In other words, rather than always varying the scaling factor when there is a change in stiffness or force, the scaling factor is "selectively decreased." Consequently, the velocity or distance moved by the slave device is also selectively decreased when the slave device physically contacts said material having a greater estimated stiffness as compared to said material having a lesser estimated stiffness.

Once the scaling factor S has been determined by gain scheduler 604, this information is used by scaling operator 606. The scaling operator 606 uses the scaling factor S to modify a motion control command. According to some embodiments, this can be performed as a multiplication operation in which the scaling factor is multiplied by a motion control signal value which represents a velocity command from the user. For example, if a motion control command specifies that manipulator 212 is to move in a direction at a velocity v, then the scaling operator would modify the motion control command to specify a modified velocity $v_m = v \cdot S$ Similarly, if the motion control command specifies that the manipulator 212 is to move a certain distance during a certain time period, then that distance can be adjusted in accordance with the scaling factor. The foregoing scaling operations can be performed for linear movement, rotational movement, or both types of movement.

Other embodiments of the invention are also possible. For example, rather than simply slowing down all motions of the manipulator 212 in accordance with a single scaling factor S, a multi-axial approach could also be used. In that case, values for $S_x$, $S_y$, $S_z$ could be calculated for independently scaling motion commands for linear movement occurring with respect to each of an x, y, and z axis. Similarly, values for $S_{x(r)}$, $S_{y(r)}$, $S_{z(r)}$ could be calculated for independently scaling motion commands for rotational movement occurring with respect to each of an x, y, and z axis.

It should be appreciated that while embodiments of the invention have been described in terms of a robot slave device 202 such as a UGV and a robotic manipulator arm 212, the invention is not intended to be so limited. Instead, the remotely controlled slave device 202 can include any type of device, provided that such device is capable of being remotely controlled by an operator through the use of telematic systems. As used herein, the phrase telematic system can include any technology capable of sending, receiving, and storing information via telecommunication devices in conjunction with effecting control on remote objects.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for telematic control of a slave device, comprising:
    sensing a physical displacement of a user interface control in a control direction;
    responsive to said sensing, communicating a motion control command to said slave device to cause a slave device motion;
    based on information obtained from at least one slave device sensor, which is located at the slave device, automatically estimating a stiffness of a material physically contacted by said slave device; and
    dynamically scaling said motion control command based on said stiffness which has been estimated and a magnitude of force exerted upon said slave device by said material physically contacted.

2. The method according to claim 1, further comprising specifying with said motion control command a first velocity at which said slave device is to move, and wherein said scaling step further comprises modifying said motion control command to specify a second velocity which is different compared to said first velocity.

3. A method for telematic control of a slave device, comprising:
    sensing a physical displacement of a user interface control in a control direction;
    responsive to said sensing, communicating a motion control command to said slave device to cause a slave device motion;
    based on information obtained from at least one slave device sensor, automatically estimating a stiffness of a material physically contacted by said slave device;
    dynamically scaling said motion control command based on said stiffness; and
    specifying with said motion control command a first velocity at which said slave device is to move;
    wherein said scaling step further comprises (1) modifying said motion control command to specify a second velocity which is different compared to said first velocity and (2) modifying said second velocity to be less than said first velocity.

4. The method according to claim 3, wherein said scaling step further comprises modifying said motion control command so that said second velocity is selectively decreased to a greater extent when said slave device physically contacts said material having a greater estimated stiffness as compared to said material having a lesser estimated stiffness.

5. The method according to claim 1, wherein said motion control command indicates a first distance which said slave device is to move, and said scaling step further comprises modifying said motion control command to specify a second distance which is different compared to said first distance.

6. The method according to claim 5, wherein said scaling step further comprises modifying said second distance to be less than said first distance.

7. The method according to claim 6, wherein said scaling step further comprises modifying said motion control command so that said second distance is selectively decreased to a greater extent when said slave device physically contacts said material having a greater estimated stiffness as compared to materials having a lesser estimated stiffness.

8. The method according to claim 1, further comprising estimating said stiffness based on a force measurement performed by at least a first one of said slave device sensors.

9. The method according to claim 8, further comprising estimating said stiffness based on a position measurement performed by at least a second one of said slave device sensors.

10. A method for telematic control of a slave device, comprising:
    sensing a physical displacement of a user interface control in a control direction;
    responsive to said sensing, communicating a motion control command to said slave device to cause a slave device motion;
    based on information obtained from at least one slave device sensor, which is located at the slave device, automatically estimating a stiffness of a material physically contacted by said slave device based on (1) a force measurement performed by at least a first one of said slave device sensors, (2) a position measurement performed by at least a second one of said slave device sensors, and (3) a change in said force measurement and a change in said position measurement;
dynamically scaling said motion control command based on said stiffness.

11. The method according to claim 8, further comprising using said information obtained from said first and second ones of said slave device sensors to provide haptic feedback at said user interface control.

12. A robot system, comprising:
a control interface having at least one control sensor configured to sense a physical displacement of a user interface control in a control direction;
a slave device configured to move in response to at least one motion control command, said slave device including at least one slave device sensor;
a data processing system in communication with said control interface and said slave device, and configured to generate said at least one motion control command in response to sensor data obtained from said at least one control sensor;
a stiffness estimator configured to automatically estimate a stiffness of a material physically contacted by said slave device based on information obtained from said at least one slave device sensor which is located at said slave device;
a scaling unit responsive to said stiffness estimator and configured to dynamically scale said at least one motion control command based on said stiffness which has been estimated and a magnitude of force exerted upon said slave device by said material physically contacted.

13. The robot system according to claim 12, wherein said motion control command indicates a first velocity at which slave device is to move, and wherein said scaling unit is configured to modify said motion control command to specify a second velocity which is different compared to said first velocity.

14. A robot system, comprising:
a control interface having at least one control sensor configured to sense a physical displacement of a user interface control in a control direction;
a slave device configured to move in response to at least one motion control command, said slave device including at least one slave device sensor;
a data processing system in communication with said control interface and said slave device, and configured to generate said at least one motion control command in response to sensor data obtained from said at least one control sensor;
a stiffness estimator configured to automatically estimate a stiffness of a material physically contacted by said slave device based on information obtained from said at least one slave device sensor; and
a scaling unit responsive to said stiffness estimator and configured to dynamically scale said at least one motion control command based on said stiffness;
wherein said motion control command indicates a first velocity at which slave device is to move;
wherein said scaling unit is configured to (1) modify said motion control command to specify a second velocity which is different compared to said first velocity, and (2) modify said second velocity to be less than said first velocity.

15. The robot system according to claim 14, wherein said scaling unit is configured to modify said motion control command so that said second velocity is selectively decreased to a greater extent when said slave device physically contacts said material having a greater estimated stiffness as compared to said material having a lesser estimated stiffness.

16. The robot system according to claim 12, wherein said motion control command indicates a first distance which slave device is to move, and said scaling unit is configured to modify said motion control command to specify a second distance which is different compared to said first distance.

17. The robot system according to claim 16, wherein said scaling unit is configured to modify said second distance to be less than said first distance.

18. The robot system according to claim 17, wherein said scaling unit is configured to modify said motion control command so that said second distance is selectively decreased to a greater extent when said slave device physically contacts said material having a greater estimated stiffness as compared to said material having a lesser estimated stiffness.

19. The robot system according to claim 12, wherein said stiffness estimator is configured to estimate said stiffness based on a force measurement performed by at least a first one of said slave device sensors.

20. The robot system according to claim 19, wherein said stiffness estimator is configured to estimate said stiffness based on a position measurement performed by at least a second one of said slave device sensors.

21. A robot system, comprising:
a control interface having at least one control sensor to sense a physical displacement of a user interface control in a control direction;
a slave device configured to move in response to at least one motion control command, said slave device including at least one slave device sensor;
a data processing system in communication with said control interface and said slave device, and configured to generate said at least one motion control command in response to sensor data obtained from said at least one control sensor;
a stiffness estimator configured to automatically estimate a stiffness of a material physically contacted by said slave device based on (1) information obtained from said at least one slave device sensor, (2) a force measurement performed by at least a first one of said slave device sensors, (3) a position measurement performed by at least a second one of said slave device sensors, and (4) a change in said force measurement and a change in said position measurement; and
a scaling unit responsive to said stiffness estimator and configured to dynamically scale said at least one motion control command based on said stiffness.

22. The robot system according to claim 12, wherein said data processing system is responsive to said information obtained from said at least one slave device sensor configured to generate a haptic feedback control signal, and said user interface control further comprises at least one motivating device responsive to said haptic feedback control signal for generating haptic feedback.

* * * * *